United States Patent [19]

Newman

[11] Patent Number: 5,161,096

[45] Date of Patent: Nov. 3, 1992

[54] METHOD AND CIRCUIT TO QUICKLY START A NEGATIVE SWITCHING VOLTAGE REGULATOR

[75] Inventor: Lee A. Newman, Dayton, Ohio

[73] Assignee: NCR Corporation, Dayton, Ohio

[21] Appl. No.: 778,417

[22] Filed: Oct. 16, 1991

[51] Int. Cl.⁵ .......................................... H02M 3/156
[52] U.S. Cl. ...................................... 363/49; 323/901
[58] Field of Search ........................ 323/901, 284, 285; 307/64, 66; 363/49

[56] References Cited

U.S. PATENT DOCUMENTS

| | | | |
|---|---|---|---|
| 4,209,710 | 6/1980 | Quarton | 307/66 |
| 4,344,122 | 8/1982 | Jones | 363/23 |
| 4,511,956 | 4/1985 | Dewan | 363/49 |
| 4,642,746 | 2/1987 | Lösel | 363/49 |
| 4,788,450 | 11/1988 | Wagner | 307/64 |
| 4,982,149 | 1/1991 | Shimanuki | 323/274 |

Primary Examiner—Steven L. Stephan
Assistant Examiner—Ben M. Davidson
Attorney, Agent, or Firm—Elmer Wargo

[57] ABSTRACT

A method and circuit for quickly starting a negative switching voltage regulator to reach a certain level of negative voltage. A regulator chip is used in the circuit, with the circuit having an output terminal from which the negative voltage is obtained. The chip has a start pin thereon and also has an internal transistor which switches on and off to provide an increasing negative voltage at the output terminal. In response to a Start signal at the start pin, a start up circuit is used to provide a forcing current at the output terminal via a second source of negative voltage. When the increasing negative voltage at the output terminal reaches the voltage level of the second source, the start up circuit is turned off.

12 Claims, 2 Drawing Sheets

METHOD AND CIRCUIT TO QUICKLY START A NEGATIVE SWITCHING VOLTAGE REGULATOR

BACKGROUND OF THE INVENTION

1. Field of the Invention

This invention relates to a method and circuit for quickly starting a negative switching voltage regulator to reach a certain level of negative voltage.

2. Background Information.

A typical negative switching voltage regulator is one which employs a switching voltage regulator chip, like chip TL497, which is manufactured by Texas Instruments, for example. The regulator chip is used in a circuit which has a output terminal from which the regulated negative voltage is obtained. The regulator chip includes a start terminal and an internal switching transistor which switches "on" and "off" to provide current to other elements included in the circuit. As soon as an energizing signal is placed on the start terminal, the switching transistor starts to switch on and off, and during this start-up time, the voltage on the output terminal of the circuit begins to increase in a negative direction.

One of the problems with a typical prior art negative switching voltage regulator of the type mentioned is that the negative output voltage typically can take up to 10 seconds to reach its predetermined level. If, for example, a liquid crystal display (LCD) is operated from the negative voltage, during the 10 seconds that the voltage is increasing to the predetermined level, the LCD and the terminal in which the LCD is located may be considered inoperative. In some situations, the negative voltage from the circuit may not reach the desired negative level at all.

SUMMARY OF THE INVENTION

An object of this invention is provide a method and apparatus for quickly and reliably starting a negative switching voltage regulator.

Another object is to design a starting circuit which is simple and inexpensive to manufacture.

In one aspect of a preferred embodiment of this invention, there is provided a circuit comprising:

a source of negative voltage;

a switching regulator circuit having an output terminal and a chip having a start input thereto, with the voltage at said output terminal slowly increasing towards a regulated predetermined negative voltage when an energizing signal is placed on said start input; and a start circuit coupled to said source of negative voltage, said output terminal, and said start input to couple the voltage from said source of negative voltage to said output terminal as soon as the energizing signal is placed on said start input and to uncouple said source of negative voltage from said output terminal when the voltage coming from the switching regulator circuit is greater than the voltage at the source of negative voltage but less than said predetermined voltage.

In another aspect a preferred embodiment of this invention, there is provided a method of reliably and quickly starting a switching regulator circuit having an output terminal and a switching regulator chip having a start terminal, said method comprising the steps of:

(a) placing an energizing signal on said start terminal causing said switching regulator chip to provide a first source of negative voltage which increases towards a predetermined negative voltage at said output terminal;

(b) coupling a second source of negative voltage to said output terminal in response to said energizing signal, with the voltage of said second source being less than said predetermined negative voltage; and (c) uncoupling said second source of negative voltage from said output terminal when the increasing negative voltage from the switching regulator chip reaches the voltage of said second source of negative voltage.

The above objects and advantages to be discussed will be more readily understood in connection with the following description, claims, and drawing.

DESCRIPTION OF THE PREFERRED EMBODIMENT

Figure 1A:
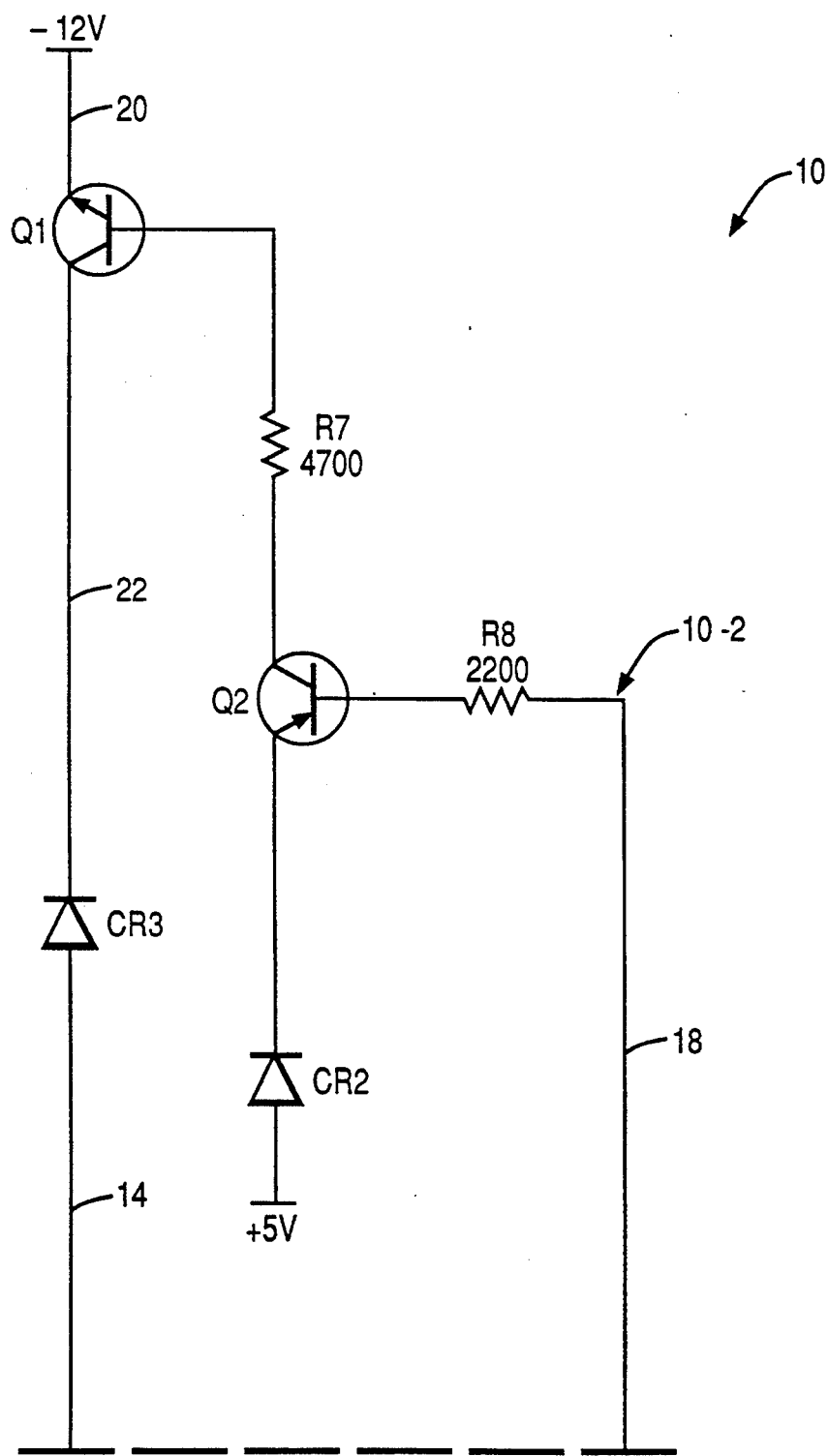
FIGS. 1A and 1B, taken together, show a circuit which is a preferred embodiment of this invention.
Figure 1B:
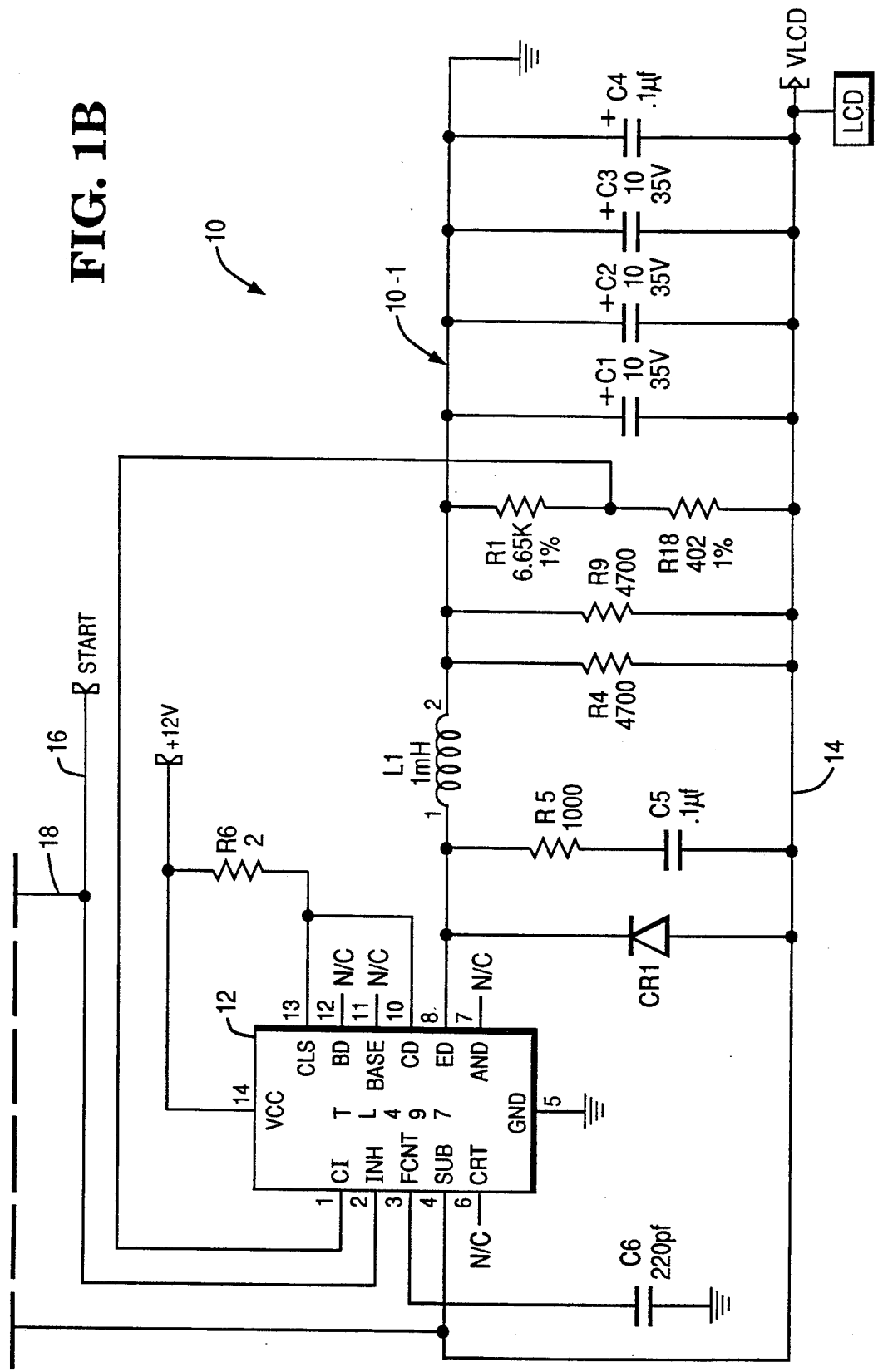

FIGS. 1A and 1B, taken together, show a circuit 10 made according to this invention. The circuit 10 includes a first circuit portion 10-1 shown in FIG. 1B, and it also includes a second circuit portion 10-2 shown in FIG. 1A.

The first circuit portion 10-1 (FIG. 1B) represents a typical negative switching voltage regulator circuit which includes a regulator chip 12, like chip TL497, which is manufactured by Texas Instruments, for example. The first circuit portion 10-1 also includes: resistors R1, R4, R5, R6, R9, and R18; capacitors C1, C2, C3, C4, C5, and C6; and inductor L1 which are all interconnected conventionally, as shown, to provide a negative switching voltage regulator. Typical sizes of the components used in FIG. 1B are shown thereon.

The first circuit portion 10-1 has an output VLCD which is connected to an output conductor 14. The regulator chip 12 has an internal switching transistor (not shown) coupled to pins 8 and 10 of the regulator chip 12; this transistor switches on and off to provide a current through the inductor L1. This internal switching transistor starts the switching in response to a Start signal placed on conductor 16. The Start signal changes the voltage level on conductor 16 from a high level to a low level when the Start signal is applied. The Start signal may come from a controller (not shown) which is not important to an understanding of this invention.

In normal operation, the voltage level at the output VLCD of the first circuit portion 10-1 begins to increase in the negative direction as soon as the internal transistor starts switching on and off in response to the Start signal falling to a low level. In a typical application, the voltage level at the output VLCD may reach a predetermined level, like about a negative 20 volts, after a period of up to ten seconds as stated earlier herein. In some situations, the voltage at the output VLCD may not come up to specifications at all.

A feature of the present invention is that it provides a method and circuit to quickly and reliably start the negative switching voltage regulator circuit shown as first circuit portion 10-1 shown in FIG. 1B. This quick starting is effected through providing a forcing current onto the output VLCD. The second circuit portion 10-2 shown in FIG. 1A provides the forcing current.

Generally stated, the second circuit portion 10-2 is a start circuit which is coupled to a second source of negative voltage (−12 Volts) to couple the second source of negative voltage to the output terminal VLCD as soon as the Start signal becomes active. The second circuit portion 10-2 also uncouples the second source of negative voltage (−12 Volts) from the output terminal VLCD when the voltage coming from the first circuit portion 10-1, itself, is greater than the voltage at the second source of negative voltage, but is less than the predetermined voltage (−20 Volts) of the first circuit portion 10-1.

The operation of the second circuit portion 10-2 will now be described with reference to FIG. 1A. When the Start signal is placed on conductor 16, the low level signal is also placed on conductor 18 which is fed into the base of a PNP transistor Q2 through a resistor R8 to cause transistor Q2 to conduct. The emitter of transistor Q2 is coupled through a diode to a source of +5 Volts. When the transistor Q2 conducts, a positive voltage from the collector of transistor Q2 is placed on the base of an NPN transistor Q1 through a resistor R7, causing the transistor Q1 to conduct. The emitter of transistor Q1 is coupled to the second source of negative voltage (−12 Volts) via conductor 20. When the transistor Q1 conducts, the collector of Q1 and the conductor 22 will have a nominal −12 Volts thereon. Because the conductor 22 has a −12 Volts thereon, it pulls conductor 14 to the nominal −12 Volts through a diode CR3. Due to the voltage drop across the transistor Q1 and the diode CR3, the actual voltage on conductor 14 and the output VLCD is about −11.2 or −11.3 Volts.

To review, as soon as the Start signal is placed on the regulator chip 12, the second circuit portion 10-2 causes a forcing current (the second source of negative voltage −12 Volts) to be applied to the output VLCD of the circuit 10. The first circuit portion 10-1 continues to provide an increasing negative voltage to the output VLCD of the circuit 10 until the output of the first circuit portion 10-1 reaches the predetermined amount; in the embodiment described, this predetermined amount is about −20 Volts. The diode CR3 continues to conduct until the voltage coming from the first circuit portion 10-1 and appearing at the output VLCD reaches the nominal −12 Volts. When the output VLCD reaches −12 Volts, the diode CR3 will no longer conduct; this will cause the second circuit portion 10-2 to drop out of the circuit 10. This is an important feature for lap top terminals because it saves battery power. The first circuit portion 10-1 will continue to increase the negative voltage at the output VLCD until the predetermined voltage level is reached. The output voltage VLCD of the circuit 10 may be coupled to an LCD as shown in FIG. 1B.

A discussion of some miscellaneous points appears appropriate. When the internal switching transistor in the regulator chip 12 switches "off", the inductor L1 wants to maintain the same current and current direction. In fact, the inductor L1 wants to pull the current towards ground level; the additional current comes from output VLCD and passes through diode CR1. Diode CR2 (FIG. 1A) is there to make sure that the transistor Q2 is turned on when the Start signal goes to a low or active level; it also makes sure that the transistor Q2 is turned off when the signal level on the Start pin of the regulator chip 12 is at a high level. The diode CR3 is also present to make sure that switching voltage generated by the first circuit portion 10-1 can increase to a more negative level than the voltage level of the second source of negative voltage which is −12 V.. is in the embodiment described. Naturally, the voltage levels discussed herein can be changed to accommodate different applications. A feature of this invention is that there is a definite start up point and turn off point for the second circuit portion 10-2.

What is claimed is:

1. A circuit comprising:
   a source of negative voltage;
   a switching regulator circuit having an output terminal and a chip having a start input thereto, with the voltage at said output terminal slowly increasing towards a regulated predetermined negative voltage when an energizing signal is placed on said start input; and
   a start circuit coupled to said source of negative voltage, said output terminal, and said start input to couple the voltage from said source of negative voltage to said output terminal as soon as the energizing signal is placed on said start input and to uncouple said source of negative voltage from said output terminal when the voltage coming from the switching regulator circuit is greater than the voltage at the source of negative voltage but less than said predetermined voltage.

2. The circuit as claimed in claim 1 in which said start up circuit includes a diode having an anode and a cathode, with the anode coupled to said output terminal, and said start up circuit also includes coupling means coupling the cathode of said diode to said source of negative voltage.

3. The circuit as claimed in claim 2 in which said coupling means includes a transistor which couples the cathode of said diode to said source of negative voltage.

4. The circuit as claimed in claim 2 in which said coupling means includes a first transistor and a second transistor, with said first transistor being coupled to said start input and said second transistor to condition said second transistor to couple the cathode of the diode to said voltage terminal when the energizing signal is placed on the start input.

5. The circuit as claimed in claim 4 in which said first transistor is a PNP transistor and said second transistor is an NPN transistor, and in which said coupling means also includes a diode having its cathode coupled to the emitter of said PNP transistor and its anode coupled to a terminal for connection to a source of positive voltage.

6. The circuit as claimed in claim 1 in which said start up circuit includes a diode having its anode coupled to said output terminal and its cathode coupled to said source of negative voltage.

7. The circuit as claimed in claim 6 in which said circuit also includes a liquid crystal display, with said output terminal connected to said liquid crystal display.

8. A circuit comprising:
   a switching regulator circuit having an output terminal and also having a switching regulator chip having a start input thereto, with the voltage at said output terminal slowly increasing towards a regulated predetermined negative voltage when an energizing signal is placed on said start input; and
   a start circuit having a voltage terminal for connection to a source of negative voltage;
   said start circuit having coupling means coupling said voltage terminal to said output terminal as soon as the energizing signal is placed on said start input and uncoupling said voltage terminal from said output terminal when the voltage coming from the switching regulator circuit is greater than the voltage at the voltage terminal but less than said predetermined voltage.

9. The circuit as claimed in claim 8 in which said start up circuit includes a diode having its anode coupled to said output terminal and its cathode coupled to said source of negative voltage.

10. A method of reliably and quickly starting a switching regulator circuit having an output terminal and a switching regulator chip having a start terminal, said method comprising the steps of:
(a) placing an energizing signal on said start terminal causing said switching regulator chip to provide a first source of negative voltage which increases towards a predetermined negative voltage at said output terminal;
(b) coupling a second source of negative voltage to said output terminal in response to said energizing signal, with the voltage of said second source being less than said predetermined negative voltage; and
(c) uncoupling said second source of negative voltage from said output terminal when the increasing negative voltage from the switching regulator chip reaches the voltage of said second source of negative voltage.

11. The method as claimed in claim 10 in which the coupling step (b) and the uncoupling step (c) are effected through using a diode.

12. The method as claimed in claim 10 in which the coupling step (b) and the uncoupling step (c) are effected through using a single diode.

* * * * *